United States Patent Office 3,419,465
Patented Dec. 31, 1968

3,419,465
SAPONIFIED ROSIN SOLUTION OF A VINYL POLYMER AND METHOD OF SIZING PAPER THEREWITH
Iwao Maruta, Yawata-machi, Japan, assignor to Kao Soap Company, Ltd., Tokyo, Japan, a corporation of Japan
No Drawing. Filed Apr. 5, 1965, Ser. No. 445,735
2 Claims. (Cl. 162—168)

ABSTRACT OF THE DISCLOSURE

An aqueous composition for use in engine sizing paper, suitable for use in high concentration at low temperatures, is prepared by dissolving a water-insoluble vinyl polymer selected from the group consisting of polyvinyl acetate, water-insoluble partially saponified derivatives of polyvinyl acetate, acetalized polyvinyl alcohols, polymers of dodecyl acrylate, polymers of methyl methacrylate, and water-insoluble copolymers of vinyl acetate with a member selected from the group consisting of vinyl pyrrolidone, acrylic acid amide, sodium acrylate and maleic anhydride, the water-insoluble vinyl polymer being dissolved in a saponified rosin solution and being present in an amount from 5 to 200 parts by weight per 100 parts by weight of the saponified rosin.

---

This invention relates to novel sizing agents for making paper.

For a sizing agent for making paper, it has been recommended, for a long time, to use rosin or a substance containing a large amount of a resin acid which is a main constituent of rosin, such as abietic acid or neoabietic acid, such other substances including, for example, tall oil, tall oil rosin or unrefined rosin. Rosin or substances, as aforesaid, which contain a large amount of resin acids which are a main constituent of rosin, shall be referred to hereinafter merely as "rosin." In practice, rosin is insoluble in water so that there is used a method (called engine sizing) wherein rosin is first converted into a soluble salt hereinafter called "saponified rosin" or "rosin soap," such as a sodium salt, an aqueous solution of such salt is added to the pulp slurry and then an aluminum sulfate salt is added thereto to precipitate the rosin on the fibers.

However, in using rosin as a sizing agent, there are always some problems including (1) the difficulty of handling the rosin and (2) the insufficient sizing effect. Below room temperature, the rosin soap is so low in solubility that it is difficult to prepare a concentrated solution of it. At a low temperature, the entire system will solidify or its solid part will separate and precipitate. Thus, it is very inconvenient to use and/or transport a rosin soap. It is a known fact that its sizing effect is not sufficient. As a method of improving it, there has been suggested a so-called fortified rosin prepared by adding an α,β-unsaturated polybasic acid, such as maleic acid, as is disclosed, for example, in U.S. Patent No. 2,628,918.

An object of the present invention is to provide an entirely new sizing agent obtained as a concentrated solution to improve the sizing effect of rosin.

The present invention relates to a sizing agent for making paper which sizing agent is obtained by making a vinyl polymer which is insoluble in water, such as polyvinyl acetate (which shall be abbreviated merely as PVAc hereinafter), water-soluble with a higher carboxylate having a surface activity, such as a rosin soap. This shall be more particularly explained. A vinyl polymer inherently insoluble in water, such as PVAc, is dissolved in a concentrated rosin soap (such system shall be briefly referred to hereinafter as a water-solubilized polymer). The thus obtained water-solubilized polymer shows an excellent sizing effect. Although it contains a large amount of the rosin soap, no solids will precipitate from it even at a low temperature.

Therefore, it is very convenient to handle and transport. Further, several additional advantages of it, such as are described in later paragraphs, have been discovered.

The vinyl polymer specified herein refers to a polymer of at least three monomers represented by the following general formula:

wherein Y stands for a hydrogen atom or a methyl radical and X stands for a chlorine atom, hydroxyl radical or its acetals or esters, carboxyl radical or its esters or amides, pyrrolidyl radical, pyridyl radical or phenyl radical.

As suitable polymers, there can be mentioned polyvinyl acetate, its partially saponified derivatives (which should be insoluble in water) and acetalized polyvinyl alcohols (which may contain a small amount of an ester bond). In such case, formal, acetoacetal and butyral are the generally used acetals. Further, there can be enumerated derivatives (which include partially hydrolyzed substances and should be insoluble in water) of acrylic acid and methacrylic acid, such as dodecyl acrylate and methyl methacrylate.

According to our investigations, polymers consisting only of styrene, acrylonitrile and vinyl chloride cannot be made water-soluble even with a concentrated rosin soap solution. Further, as polymers such as vinyl pyrrolidone, acrylic acid amide and sodium acrylate are inherently water-soluble, they are not included in the vinyl polymers of the present invention.

However, even those monomers which will singly produce water-soluble polymers will be able to be used when they are copolymerized with vinyl acetate or the like. Further, a small amount of styrene or acrylonitrile also can be contained in a polymer of vinyl acetate. A copolymer of a α,β-unsaturated polybasic acids, such as maleic anhydride, with vinyl acetate can also be used, if it is insoluble in water.

In the present invention, the weight ratio of the rosin soap to the polymers can be varied within a wide range. However, the ratio from which an excellent effect can be expected for a given kind of polymer is naturally limited but is quite different depending on the kind, molecular weight and synthesizing process of the polymer, the saponification degree and purity of the rosin soap to be used and the kind of the opposed ions, so that it is difficult to individually define the precise range. However, generally, in working the present invention, it is preferable that from 5 to 200 parts by weight of a polymer should be used per 100 parts by weight (the parts by weight shall, for brevity, be mentioned merely as "parts" hereinafter) of a rosin soap. The concentration of the rosin soap in the aqueous solution used in water-solubilizing a vinyl polymer should be higher than its critical micelle concentration. But, in the industrial practice of the invention, a concentration of 10 to 35% of the rosin soap is desirable. When a soap concentration of less than 10% is desired, it will be preferred to first prepare a product of a higher concentration and then dilute it with water. In case a soap concentration of more than 35% is desired, it will be preferred to obtain the high concentration by concentrating the solution instead of initially preparing a product of the high concentration.

Further, in obtaining the sizing agent of the present invention, the rosin soap and vinyl polymer may be dissolved in suitable organic solvent, such as, for example, ethanol, so as to form a water-solubilized polymer in the solvent.

The thus obtained water-solubilized polymer is added to a pulp slurry as it is or as diluted with water.

It should be noted that when the ratio of the vinyl polymer to the rosin soap is too large, even if the solution seems to be transparent, the vinyl polymer will not yet be made water-soluble and that, therefore, if it is poured into a large amount of water, the vinyl polymer will be precipitated as an insoluble in the form of an emulsion, suspension or solid mass. Further, in the above, in case the ratio of the organic solvent to water is within a certain range, the water-solubilized polymer may not dissolve in the system.

It is stated in the above that the water-solubilized polymer has special advantages as a sizing agent. This shall be shown by the following examples.

When a 15% solution of a commercial rosin soap of a 90% saponified rosin of a WW (water-white) grade was left at a temperature of 10° C. for two hours, a large amount of a solid substance was precipitated from the solution. On the other hand, when 3.2% by weight of water-solubilized polymer of PVAc was added to the above-mentioned solution, was left at −7° C. for 72 hours, the solution remained transparent and uniform. It is evident also from this example that a concentrated sizing agent solution was obtained.

The following experiment was made. One hundred fifty g. of an unbleached sulfite pulp were soaked in water for two hours, were dissociated for five minutes at 20° C. in 10 liters of water and were then beaten for one hour with a Tappi standard beater of 10 liters capacity. The pulp was further diluted with water so as to form a pulp concentration of 0.1%. One liter of this product was poured into a glass cylinder. The time required from just after the completion of the pouring until the supernatant liquid in the cylinder became 100 cc. was measured. The degree of dispersion was judged by the number of seconds in this time period.

6.4 g. of PVAc (in which 17% of the total saponification value was hydrolyzed and which contained a free hydroxyl radical and was insoluble in water) having a degree of polymerization of 1620, were dissolved in 93.6 g. of a 15% rosin soap solution. When 0.025% of this sizing agent, calculated as the solids, was added to the above pulp dispersion, the degree of dispersion was 320 seconds. When no sizing agent was added, the degree of dispersion was only 39 seconds. It is evident from this experiment that the sizing agent according to the present invention does disperse the pulp.

Another advantage of the present invention is that the migration of the sizing agent to the papermaking felt is quite small. After a paper web is made, the wet paper web is moved onto the felt and is compressed and dehydrated with rollers. During the opreation of the paper making machine for a long time, the felt will be stained with a part of the sizing agent not remaining on the pulp. This is quite undesirable in the operation.

In order to increase the strength of paper, PVAc may be added in the form of an emulsion to the pulp slurry. In such case, the reduction in the above-mentioned staining of the felt is remarkable.

The following experiments were carried out. Pulp slurries were prepared in the following manner. Three g. of pulp were immersed in 140 cc. of water for five minutes and were then dissociaetd with a dissociator for 10 minutes. A fixed amount of 5% aqueous solutions of various sizing agents were added to the respective pulp slurries. Then three cc. of 8% aqueous solution of aluminum sulfate were added to the slurries. The slurries were lightly stirred for 10 minutes. The pulp slurry solutions were filtered under suction using a felt as a filtering cloth. The sizing agent deposited on the felt was measured. The sizing agents used were (1) a commercial maleic acid fortified product and (2) a PVAc emulsion and (3) a water-solubilized polymer according to the invention. The results are shown in the following table.

(1) Table.—Migration of sizing agents to felt

Sizing agents:
  Water-solubilized polymer _____ 0.045
  Maleic acid fortified rosin _____ 0.063
  PVAc (emulsion) _____ 0.097
Amount in percent of migration to felt.

The water-solubilized polymer used here was prepared by dissolving 3.7 g. of polyvinyl butyral in 96.3 g. of an aqueous solution of a 15% rosin soap. As evident from the above table, in the case of the sizing agent of the present invention, the staining of the felt is quite small.

The water-solubilized polymer can be made by any suitable method. For example, a small cake of a vinyl polymer is mixed in a rosin soap solution and is heated to 50 to 70° C. so as to be dissolved over a period of twenty hours or more. Then the undissolved polymer may be removed by filtration or centrifugal separation.

Example 1

Forty g. of small grains of PVAc were mixed into 400 g. of a solution of 15% rosin soap and the mixture was stirred at 60° C. for about 40 hours. The undissolved PVAc was then removed by filtration. The filtrate contained 5% dissolved PVAc. Two percent by weight, based on the dried weight of the pulp, of the above water-solubilized polymer was added to a beaten bleache dsulfite pulp (of a beating degree of 45° S.R.). The mixture was well stirred. Two percent by weight, aluminum sulfate was then added to the mixture. Paper was made from the pulp mixture according to Japanese Industrial Standard P8209—1961 by using a Tappi standard sheet machine. After the sizing, the content of the pulp in the pulp slurry was 0.2% by weight. One liter of the slurry was used.

When the sized degree of the obtained paper was measured according to Japanese Industrial Standard P8122–1954, it was 85 seconds. On the other hand, on an otherwise identically prepared sheet, except that there was used a commercial maleic acid fortified rosin soap, the sized degree was 71.8 seconds.

Example 2

Fifty g. of polyvinyl formal in the form of chips were added to 500 g. of a 16% solution of rosin soap. The mixture was stirred at 40° C. for 70 hours. Then the unsolubilized polyvinyl formal was removed by filtration.

This solution contained 3.2% by weight dissolved polyvinyl formal.

In Example 2, the pulp used to make paper was a buna sulfite pulp. In this case 2% by weight of the above-mentioned water-solubilized polymer was added to the pulp, the sized degree was 9.3 seconds. On the other hand, when a commercial rosin soap was used as the sizing agent, the sized degree was 5.6 seconds.

Example 3

1.0 g. of dodecyl acrylate and 2.4 g. of polyvinyl formal were dissolved in 96.8 g. of a 14% solution of a tall oil rosin soap in the same manner as in Example 1. The sized degree of paper obtained in the same manner as in Example 1 by using the above solution as a sizing agent was 35.0 seconds. On the other hand, in case a plain tall oil rosin soap was used as a sizing agent, the sized degree was 28.7 seconds.

Example 4

Following the procedure referred to in Example 3, the water-solubilized polymer contained 5% PVAc in which 20% of the total saponification value was partially oxidized and 14% of a rosin potassium saponified soap. The sized degree of the obtained paper was 33.1 seconds.

The embodiments of the invention in which an exclusive property or privilege is claimed are defined as follows:

1. An aqueous solution of a sizing agent for making paper, comprising a water-insoluble vinyl polymer selected from the group consisting of polyvinyl acetate, water-insoluble partially saponified derivatives of polyvinyl acetate, acetalized polyvinyl alcohols, polymers of dodecyl acrylate, polymers of methyl methacrylate, and water-insoluble copolymers of vinyl acetate with a member selected from the group consisting of vinyl pyrrolidone, acrylic acid amide, sodium acrylate and maleic anhydride, the water-insoluble vinyl polymer being dissolved in a saponified rosin aqueous solution containing from about 10 percent to about 35 percent by weight of the saponified rosin and being present in an amount of from 5 to 200 parts by weight per 100 parts by weight of the saponified rosin.

2. A method of sizing paper which comprises dissolving in a saponified rosin solution a water-insoluble vinyl polymer selected from the group consisting of polyvinyl acetate, water-insoluble partially saponified derivatives of polyvinyl acetate, acetalized polyvinyl alcohols, polymers of dodecyl acrylate, polymers of methyl methacrylate, and water-insoluble copolymers of vinyl acetate with a member selected from the group consisting of vinyl pyrrolidone, acrylic acid amide, sodium acrylate and maleic anhydride, the water-insoluble vinyl polymer being present in an amount of from 5 to 200 parts by weight per 100 parts by weight of the saponified rosin in order to form a water-soluble sizing agent solution, mixing the sizing agent solution in a slurry of paper making fibers and then making paper from said slurry.

References Cited

UNITED STATES PATENTS

| | | | |
|---|---|---|---|
| 2,402,469 | 6/1946 | Toland et al. | 162—168 |
| 2,452,870 | 11/1948 | Rust et al. | 260—27 |
| 2,614,997 | 10/1952 | Robinson et al. | 260—27 |

FOREIGN PATENTS

| | | |
|---|---|---|
| 559,359 | 2/1944 | Great Britain. |

S. LEON BASHORE, *Primary Examiner.*

U.S. Cl. X.R.

106—218, 238; 162—180; 260—27, 29.6